United States Patent Office 2,753,355
Patented July 3, 1956

2,753,355
PREPARATION OF 1,3-BIS(ARYLMETHYL)-2-ARYLIMIDAZOLIDINE COMPOUNDS

James D. Head, Midland, Mich., assignor to The Dow Chemical Company, Midland, Mich., a corporation of Delaware No Drawing. Application January 13, 1955, Serial No. 481,713

8 Claims. (Cl. 260—309.7)

This invention concerns an improved method for the preparation of imidazolidine compounds represents by the structural formula

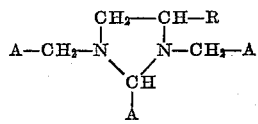

and N,N' - bis(arylmethyl) - 1,2 - diaminoalkanes represented by the formula

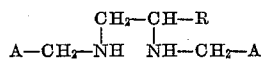

wherein the symbol R represents an alkyl group or a hydrogen atom and the symbol A represents an aryl radical having the generic formula

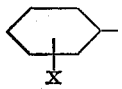

wherein the symbol X represents an alkyl group, an alkoxy group, a halogen atom or a hydrogen atom, the substituent represented by the symbol X being attached to any carbon atom of the benzene nucleus.

The improved method can be illustrated by reference to the preparation of 1,3-dibenzyl-2-phenylimidazolidine and N,N'-dibenzylethylenediamine.

One molecular proportion of ethylenediamine and about three molecular proportions of benzaldehyde are admixed and hydrogenated with hydrogen in contact with a hydrogenation catalyst. The reaction which occurs can be represented by the equation:

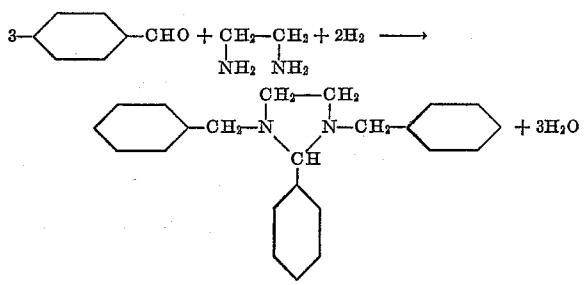

After removal of the catalyst, the 1,3-dibenzyl-2-phenylimidazolidine can be isolated from the reaction mixture. If N,N'-dibenzylethylene diamine is the desired product, it is not necessary to isolate the imidazolidine compound. Instead, the filtered hydrogenation reaction mixture can be acidified and the 1,3-dibenzyl-2-phenylimidazolidine can be hydrolyzed. The hydrolysis reaction can be represented by the equation:

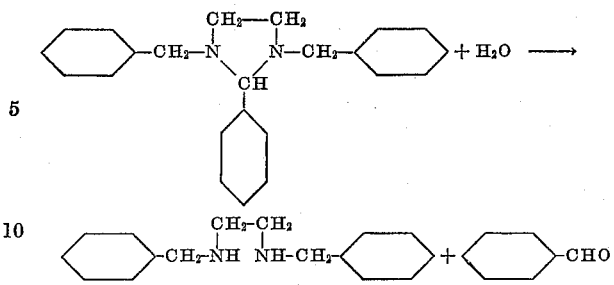

N,N'-dibenzylethylenediamine can then be isolated from the hydrolysis reaction mixture.

In place of benzaldehyde there can be used another of the aromatic aldehydes having the generic structure represented by the formula:

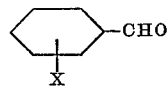

wherein the symbol X represents an alkyl group, an alkoxy group or a halogen atom, such as one of the groups methyl, ethyl, methoxy, ethoxy or chloro, or a hydrogen atom. Examples of other such aldehydes are o-, m-, or p-tolualdehyde, o- or m-methoxybenzaldehyde, anisaldehyde, and o-, m- or p-chlorobenzaldehyde.

In place of ethylenediamine there can be used another of the 1,2-diaminoalkanes having the generic structure represented by the formula

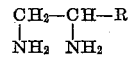

wherein the symbol R represents an alkyl group such as a methyl or ethyl group or a hydrogen atom. Examples of such other diamines are propylene diamine and 1,2-diaminobutane.

Examples of products which can be made from such starting materials, in addition to the ones already shown, are 1,3-dibenzyl-2-phenyl-4-methylimidazolidine, 1,3-dibenzyl - 2 - phenyl - 4 - ethylimidazolidine, 1,3 - bis(o-methylbenzyl) - 2 - (o - tolyl)imidazolidine, 1,3 - bis- (o - methylbenzyl) - 2 - (o - tolyl) - 4 - methylimidazolidine, 1,3 - bis(p - methoxybenzyl) - 2 - (p - methoxyphenyl)imidazolidine, 1,3 - bis(p - methoxybenzyl) - 2- (p - methoxyphenyl) - 4 - methylimidazolidine, 1,3 - bis-p - chlorobenzyl) - 2 - (p - chlorophenyl)imidazolidine, 1,3 - bis(p - chlorobenzyl) - 2 - (p - chlorophenyl) - 4-methylimidazolidine, N,N' - dibenzyl - 1,2 - diaminopropane, N,N' - dibenzyl - 1,2 - diaminobutane, N,N' - bis- (o - methylbenzyl) - ethylenediamine, N,N' - bis(o- methylbenzyl) - 1,2 - diaminopropane, N,N' - bis(p - methoxybenzyl)ethylenediamine, N,N' - bis(p - methoxybenzyl)-1,2 - diaminopropane, N,N' - bis(p - chlorobenzyl) - ethylenediamine and N,N' - bis(p - chlorobenzyl) - 1,2 - diaminopropane.

In practice of the invention, a 1,2-diaminoalkane is admixed with an aromatic aldehyde, of the kinds just described, in amounts corresponding to about three molecular proportions of the aldehyde per molecular proportion of the diamine, usually in the presence of a mutual solvent liquid diluent as a medium for the reaction. Any chemically inert solvent diluent liquid can be used, for example, hydrocarbons such as benzene and toluene, and alcohols such as methanol and ethanol. The alcohols are usually preferred because they are able to dissolve and to hold in solution water that frequently accompanies the starting materials and that is a product of the reaction. The proportion of liquid diluent in the reaction mixture is usually not critical and can be varied widely, e. g., from about 25 to about 75 or more parts by weight per 100 parts of the whole reaction mixture.

The liquid reaction mixture is then hydrogenated in the presence of a hydrogenation catalyst such as an active transition group metal or metal oxide, for example, nickel, platinum or palladium. Suitable catalytic materials consisting of such active elements or comprising such active elements supported in or on inert solid carriers are well known. For batch operation, the catalyst can be finely divided and admixed with and suspended in the liquid reaction mixture. The amount of catalyst employed, depending on the activity thereof, can correspond to from about 0.01 to about 5 or more per cent by weight of the active catalyst based on the reaction mixture. In continuous operations, the catalyst is usually employed in the form of larger granules or pieces capable of being retained in a reaction zone through which the liquid reaction mixture passes.

Hydrogen gas is supplied to the reaction mixture usually under pressure, preferably at about 10 or more pounds per square inch, gauge. During the hydrogenation, the reaction mixture is maintained at a reaction temperature, usually from room temperature to about 150° C., preferably from about 50° to about 120° C. The time necessary to complete the hydrogenation reaction depends principally upon the activity of the catalyst and upon the reaction temperature and is usually from about 0.5 to about 8 hours. When about two molecular proportions of hydrogen have been consumed for each molecular proportion of diamine charged, the reaction can be considered to be substantially complete. Since the hydrogenation is a catalytic one, the resulting reaction product mixture is free of the contaminating materials that are introduced when chemical reducing agents are employed. The imidazolidine compound thus formed can be separated from the reaction mixture or the latter can be treated to convert the imidazolidine compound therein to a corresponding N,N'-bis(arylmethyl)-1,2-diaminoalkane.

After separation of the liquid reaction mixture containing the imidazolidine compound from the catalyst, e. g., by filtration, the imidazolidine compound can be isolated from the liquid reaction mixture by usual means. Sometimes the imidazolidine compound can be obtained as a crystalline product by cooling the liquid reaction mixture or it can be obtained as a residue by evaporation of the more volatile ingredients of the reaction mixture. The imidazolidine compound can be purified in usual ways such as by recrystallization from solution in a solvent.

The imidazolidine compound can be converted to a corresponding N,N' - bis(arylmethyl) - 1,2 - diaminoalkane by hydrolysis in an aqueous medium acidified with a mineral acid. While a purified imidazolidine compound can be used as a starting material for this hydrolysis step, such is not necessary when the imidazolidine compound is prepared by the method described above. A convenient starting material is the mixture obtained by separating the catalyst from the liquid hydrogenation reaction mixture just described, especially when such mixture contains an alcohol as the inert diluent liquid. Alternatively, the residue of such reaction mixture obtained by evaporation of the inert solvent diluent can be employed. Such starting materials are generally free of ingredients that would interfere with the hydrolysis step and that are difficult to separate from the resulting diamino product. Therefore, the process of making the corresponding N,N' - bis(arylmethyl) - 1,2 - diaminoalkanes is greatly simplified by preparing an imidazolidine compound by the catalytic hydrogenation step just described and by employing a resulting imidazolidine compound-containing mixture, without isolating a pure imidazolidine compound, as starting material for the hydrolysis step.

The hydrolysis step is carried out by admixing with the imidazolidine starting materials an aqueous mineral acid such as hydrochloric acid or sulfuric acid. The amount of such acid is not critical but is usually such that the hydrolysis mixture is strongly acidic, i. e., has a pH value of about two or less. The reaction occurs rapidly and substantially quantitatively at room temperature, although the reaction mixture may be warmed and/or allowed to stand.

Sometimes the N,N'-bis(arylmethyl)-1,2-diaminoalkane can be separated in the form of its mineral acid salt by cooling the hydrolysis reaction mixture. Alternatively, the hydrolysis reaction mixture can be treated, e. g., by distillation or by steam distillation, to remove therefrom the volatile inert liquid diluent such as alcohol and the aromatic aldehyde product of the hydrolysis reaction. The N,N'-bis(arylmethyl)-1,2-diaminoalkane can be recovered from its mineral acid salt or solution in usual ways such as by first making strongly alkaline, e. g., with an alkali metal hydroxide, and separating the liberated diamino compound. The N,N'-bis(arylmethyl)-1,2-diaminoalkane can be purified in usual ways such as by distillation or by recrystallization of an acid salt.

The following examples illustrate ways in which the invention has been practiced, but should not be construed as limiting its scope.

*Example 1.—Preparation of 1,3-bis(p-methoxybenzyl)-2-(p-methoxyphenyl)imidazolidine*

A mixture of 15.4 grams (0.198 gram-mole) of ethylenediamine hydrate and 82 grams (0.6 gram-mole) of anisaldehyde, dissolved in 140 mls. of ethyl alcohol and containing 1.0 gram of a catalyst comprising 5 per cent by weight of palladium deposited on carbon, was hydrogenated in a closed vessel with agitation at temperatures between 60° and 75° C. with hydrogen gas under pressure of from 30 to 45 p. s. i. g. for three hours. About 0.8 gram (0.4 gram-mole) of hydrogen was consumed by the reaction.

The catalyst was collected on a filter and washed with ethyl alcohol. The combined filtrate and washings were cooled in ice. A part of the 1,3-bis(p-methoxybenzyl)-2-(p-methoxyphenyl)-imidazolidine crystallized out of the reaction mixture and was collected on a filter and dried. Fifty eight grams of material melting between 71° and 74° C. was obtained, corresponding to a yield of about 69 per cent of theoretical. On recrystallization from ethyl alcohol, a product melting between 74° and 75° C. was obtained.

*Example 2.—Preparation of N,N'-bis(p-methoxybenzyl) ethylenediamine*

A mixture of 30.8 grams of ethylenediamine hydrate, 163 grams of anisaldehyde, 100 mls. of ethyl alcohol and 1.5 grams of a powdered catalyst comprising 5 per cent by weight palladium deposited on carbon was charged to a hydrogenation vessel. The mixture was agitated and heated to temperatures between 25° and 65° C. while in the presence of hydrogen gas at pressures between 20 and 45 p. s. i. g. for a period of 12 hours.

The catalyst was collected by filtration and concentrated hydrochloric acid was added to the filtrate until the pH value of the mixture was about 2. The acidified mixture was cooled, whereupon a crystalline hydrochloride salt formed. The mixture was filtered at a temperature of 10° C. and the salt was washed with ethyl alcohol. Analysis of the combined filtrate and washings showed the presence therein of 61.5 grams of anisaldehyde.

The crystalline hydrochloride salt was dissolved in two liters of water and the solution was made alkaline by addition of 100 mls. of a 50 per cent by weight solution of sodium hydroxide in water. The liberated oil was extracted from the alkaline mixture at room temperature by washing with two portions totaling 300 mls. of toluene. Distillation of the toluene extract produced a fraction boiling from 204° to 206° C. at 1 mm. of mercury absolute pressure and identified as N,N'-bis(p-methoxybenzyl)ethylenediamine. The 64-gram weight of the distillate fraction corresponded to a yield of about 53 per cent of theoretical.

*Example 3.—Preparation of 1,3-dibenzyl-2-phenyl-4-methylimidazolidine*

A mixture of 23.7 grams (0.3 gram-mole) of 1,2-diamino-propane (assay 94 per cent by weight), 63.6 grams (0.6 gram-mole) of benzaldehyde and 100 mls. of ethyl alcohol was refluxed at a temperature of about 80° C. for two hours. To the cooled mixture was added 31.8 grams (0.3 gram-mole) of benzaldehyde, 30 mls. of ethyl alcohol and 1.0 gram of a finely powdered catalyst comprising 5 per cent by weight palladium deposited on carbon. The resulting mixture was hydrogenated in a closed vessel with agitation at temperatures between 24° and 39° C. under pressure of hydrogen between 25 and 45 p. s. i. g. for four hours.

The catalyst was removed by filtration of the hydrogenation reaction mixture and the filtrate was cooled. 1,3 - dibenzyl-2-phenyl-4-methylimidazolidine crystallized out of the liquor and was collected and recrystallized from ethyl alcohol. There was recovered 51 grams of 1,3 - dibenzyl-2-phenyl-4-methylimidazolidine melting between 82° and 83° C.

*Example 4.—Preparation of N,N'-dibenzyl-1,2-diaminopropane*

To a mixture of 51 grams of 1,3-dibenzyl-2-phenyl-4-methylimidazolidine and 600 grams of water with stirring was added concentrated hydrochloric acid until the pH value of the mixture was about 2. The acid mixture was washed with benzene in two portions, one of 100 mls. and one of 50 mls., in order to extract benzaldehyde from the aqueous mixture.

The acidic aqueous solution was then made strongly alkaline by adding concentrated sodium hydroxide aqueous solution until the pH value of the mixture was greater than 10. The liberated oil was separated and the aqueous layer was twice extracted with benzene using a first portion of 200 mls. and a second portion of 50 mls. The combined oil layer and benzene extract from the alkaline mixture were fractionally distilled and produced 30.5 grams of N,N'-dibenzyl-1,2-diaminopropane in a fraction boiling at temperatures between 169° and 170° C. at 2 mm. of mercury absolute pressure.

*Example 5.—Preparation of 1,3-bis(p-chlorobenzyl)-2-(p-chlorophenyl)-imidazolidine*

A mixture of 15.4 grams of ethylenediamine hydrate, 87.5 grams of p-chlorobenzaldehyde, 140 mls. of ethyl alcohol and 1.0 gram of a powdered catalyst comprising 5 per cent by weight of palladium deposited on carbon was hydrogenated with agitation at temperatures between 28° and 50° C. for 1 hour 25 minutes under pressure of hydrogen between 25 and 50 p. s. i. g.

After filtration of the warm reaction mixture to remove the catalyst, the filtrate was cooled. There crystallized from the filtrate 30 grams of 1,3-bis(p-chlorobenzyl)-2-(p-chlorophenyl)-imidazolidine product melting at temperatures between 128° and 132° C. Further amounts of product crystallized out of the mother liquor on concentration and further cooling.

*Example 6.—Preparation of N,N'-dibenzylethylenediamine*

A mixture of 206 grams of a water solution containing 58.5 per cent by weight ethylenediamine, 636 grams of benzaldehyde, 500 mls. of ethyl alcohol and 10 grams of a powdered catalyst comprising 5 per cent by weight palladium deposited on carbon was hydrogenated with agitation at temperatures between 90° and 100° C. for three hours under 500 p. s. i. g. pressure of hydrogen.

The cooled reaction mixture was filtered to separate the catalyst from the liquor. The catalyst cake was washed with hot alcohol and the washes were combined with the reaction liquor filtrate.

To the combined filtrate and washes was added two liters of 10 per cent by weight sulfuric acid aqueous solution and the acid mixture was first distilled and then steam distilled to remove alcohol and benzaldehyde from an acidic aqueous residue. The aqueous residue was made strongly alkaline with concentrated sodium hydroxide aqueous solution. The organic oil layer was separated from the alkaline aqueous layer and was fractionally distilled under reduced pressure to obtain a purified N,N'-dibenzylethylenediamine product.

I claim:

1. A method that comprises the step of hydrogenating a mixture of one molecular portion of a 1,2-diaminoalkane having the generic formula

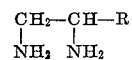

wherein the symbol R represents a member of the group consisting of hydrogen and alkyl radicals and about three molecular proportions of an aromatic aldehyde having the generic formula

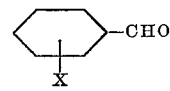

wherein the symbol X represents a member of the group consisting of hydrogen, halogen, alkyl and alkoxy radicals in the presence of a hydrogenation catalyst to produce a 1,3-bis(arylmethyl)-2-arylimidazolidine compound.

2. A method according to claim 1 wherein the starting mixture is hydrogenated with hydrogen in the presence of a chemically inert solvent diluent liquid as a medium for the reaction and in the presence of a hydrogenation catalyst at temperatures from about room temperature to about 150° C.

3. A method according to claim 2 wherein the 1,2-diaminoalkane is ethylenediamine.

4. A method according to claim 2 wherein the aromatic aldehyde is benzaldehyde.

5. A method according to claim 2 wherein the inert solvent diluent liquid is an alcohol.

6. A method according to claim 2 wherein the hydrogenation catalyst comprises catalytically active palladium.

7. A method according to claim 2 wherein the 1,3-bis(arylmethyl)-2-arylimidazolidine compound is isolated from the reaction mixture.

8. A method comprising the steps of hydrogenating a mixture of one molecular proportion of ethylenediamine and about three molecular proportions of benzaldehyde in the presence of an alcohol as medium for the reaction and in the presence of an effective proportion of a hydrogenation catalyst comprising catalytically active palladium with hydrogen at temperatures between room temperature and about 150° C. until substantially two molecular proportions of hydrogen are consumed and isolating 1,3-dibenzyl-2-phenylimidazolidine from the resulting hydrogenation reaction mixture.

References Cited in the file of this patent

UNITED STATES PATENTS

| | | |
|---|---|---|
| 2,264,894 | Shoemaker et al. | Dec. 2, 1941 |
| 2,416,042 | Brooks | Feb. 18, 1947 |

FOREIGN PATENTS

| | | |
|---|---|---|
| 903,982 | France | Oct. 23, 1945 |

OTHER REFERENCES

Van Alphen: Rec. Trav. Chim. de Pays-Bas, vol. 55, pp. 669–74 (1936).

Lob: Chem. Abst., vol. 31, col. 1385 (1937).